Figure 1:
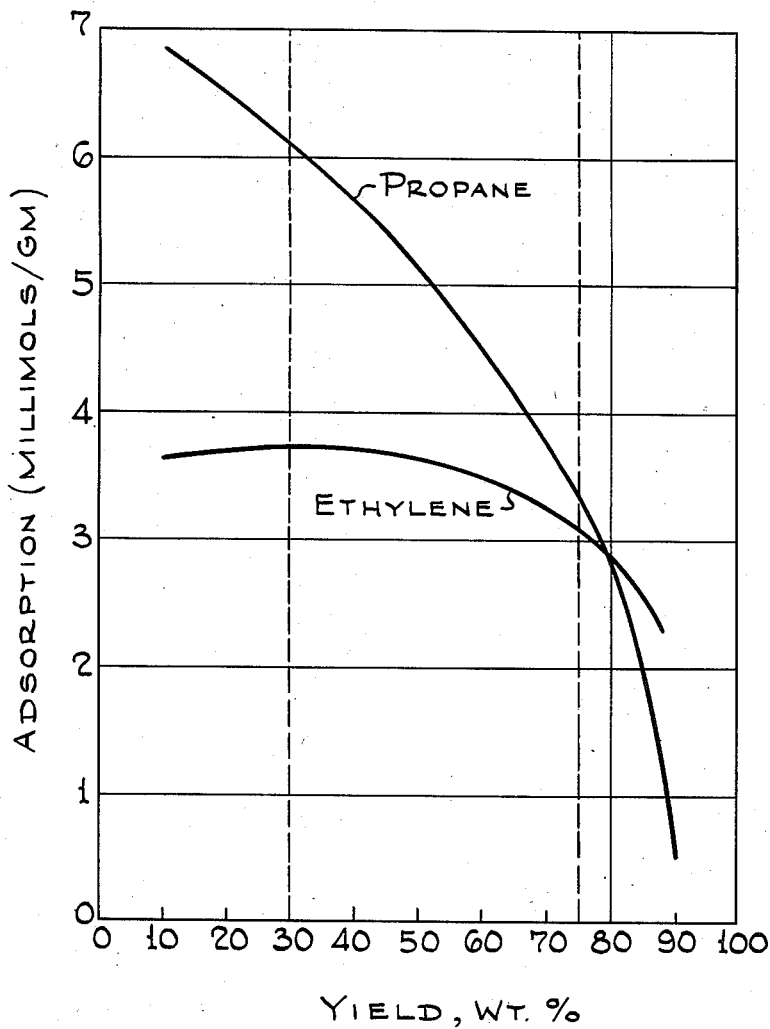

April 30, 1957  W. A. KONRAD  2,790,511
ACTIVATION OF PETROLEUM ACID SLUDGE COKE
FOR PREFERENTIAL PARAFFIN ADSORPTION
Filed May 11, 1953  3 Sheets-Sheet 3

William A. Konrad Inventor
By Henry Berk Attorney

United States Patent Office 2,790,511
Patented Apr. 30, 1957

2,790,511

ACTIVATION OF PETROLEUM ACID SLUDGE COKE FOR PREFERENTIAL PARAFFIN ADSORPTION

William A. Konrad, Springfield, N. J., assignor to Esso Research and Engineering Company, a corporation of Delaware Application May 11, 1953, Serial No. 354,224

2 Claims. (Cl. 183—114.2)

This invention relates to the preparation of an attrition-resistant activated carbon from petroleum acid sludge particularly for selective adsorption of propane in a mixture with ethylene.

The present application is a continuation-in-part of application, Serial Number 120,975, filed October 12, 1949, now abandoned, wherein is described more generally the preparation of various activated carbons from petroleum acid sludge.

It has generally been known that activated carbons produced from various cokes or chars have the property of adsorbing gaseous hydrocarbons and various coloring bodies. There are numerous activated carbons having widely varying properties depending on the precise manner in which they are formed, even when formed from the same raw materials.

In accordance with the present invention an outstanding-activated carbon is made for the preferential adsorption of propane in the presence of ethylene from a petroleum acid sludge coke that is prepared in a particular manner from the sludge and is then activated to a critical degree with reference to yield of activated carbon for obtaining a particularly high adsorptive capacity attendant with high selectivity for propane and high attrition resistance.

The petroleum acid sludges are well known to be produced as a result of various petroleum refining operations, particularly the sulfuric acid treatment of gasoline, lubricating oils, and higher-boiling petroleum distillates, such as phenol extracted oils from which the so-called white oils are produced by treatment with fuming sulfuric acid or SO₃. The resulting acid layers from the above kinds of treatments vary in character depending upon the severity of the acid treatments, but, in general, the acid layers consist in carbonaceous residues admixed with unreacted sulfuric acids, sulfonic acids, other sulfur derivatives and water from which a tarry residue called a sludge is obtained upon the settling of the acid layer. The petroleum acid sludge coke which is employed in this invention is prepared from the sludge as follows:

The tarry sludge is introduced into a decomposition zone simultaneously with a stream of preheated coke particles previously obtained from acid sludge. In the decomposition zone the liquid sludge is carbonized very rapidly by contact with the coke particles preheated to temperatures in the range of 800° F. to 1500° F. The weight ratio of the hot coke particles to the sludge varies from 2:1 to about 6:1 so that in a very short space of time, generally less than 10 minutes, the complete carbonization of the sludge on the seed coke takes place. During the carbonization of the sludge on the seed coke in the decomposition zone, volatile matter present in the sludge is distilled, and the mass of coke having a freshly carbonized sludge deposit thereon becomes cooled down to temperatures in the range of 300° F. to 750° F. The cooled coke can then be withdrawn from the sludge decomposition zone.

Any desired portion of the coke withdrawn from the decomposition zone may be transferred to a heating zone to be partially burned with air until the coke is given a temperature in the range of 800° F. to 1500° F. preferably 1000° F. to 1200° F. in a short period of time, generally 5 to 25 minutes. It is this thus heated coke which is then used as the preformed and preheated seed coke for depositing sludge thereon in the described decomposition zone.

The balance of the coke removed from the decomposition zone is the material which is then used for activation. It can be screened or classified to obtain a desired size, for example, a particle size in the range of 10 or 14 to 20 mesh. The particles larger than 10 mesh size may be comminuted by grinding and screening. This raw coke has a bulk density of about 48 lbs./cu. ft.

Studies on the preparation of carbon adsorbents have shown that the adsorptive capacity of the carbon increases as the yield level is decreased, even as the yield level is decreased to below 40 wt. percent. However, the activated product of the present invention which meets the critical requirements of high selectivity for propane in the presence of ethylene, and high attrition resistance, commensurate with good adsorptive capacity can only be prepared in the yield range of 50 to 60 wt. percent.

As shown in Fig. 1, the activity (adsorptive capacity) for both propane and ethylene tends to increase at the sacrifice of activating carbon yield from the acid sludge coke. The carbons or chars of highest activity occur in the very low yield ranges, i. e. 10 to 30 weight percent yield. These carbons or chars cannot be employed economically as adsorbents in a commercial type of operation, especially one in which the adsorbent is fluidized or moved in a stream countercurrent to a mixture of propane and ethylene which is to be separated, on account of the inferior physical characteristics of these carbons obtained at these low yields. For example, the bulk density (grams per cc.) and resistance to attrition of these low yield carbons are very poor. These carbons are light and fluffy and if used in a selective adsorption process would require the circulation of prohibitively large volumes of carbon. When the activated carbon yield from the acid sludge coke is decreased to below 50 wt. percent, the bulk density decreases and the attrition rate rises rapidly. The abrupt rise in attrition rate relative to a commercial cocoanut shell carbon when the yield is decreased to below 50 wt. percent is shown in the following table:

TABLE I

*Effect of activated char yield from acid sludge carbonized on coke*

| Yield (wt. percent) | 100 | 80 | 60 | 55 | 50 | 49 | 40 | 20 |
|---|---|---|---|---|---|---|---|---|
| Attrition rate | 0.75 | 0.95 | 1.3 | 1.3 | 1.3 | 1.5 | 2.1 | 3.9 |

The representative data points in the above table illustrate the importance of avoiding a high attrition rate by preventing the char yield from going to substantially below 50.

On the other hand, although the activated carbon formed at yields above 60 wt. percent have good attrition resistance, they have relatively poor activities and very poor selectivity for separating propane from ethylene. Therefore, in the separation of propane from ethylene, the activated carbon produced from the described kind of acid sludge coke is only suitable economically for the separation of propane from ethylene when the activated carbon yield lies in the range of 50 to 60 wt. percent.

Figure 2:
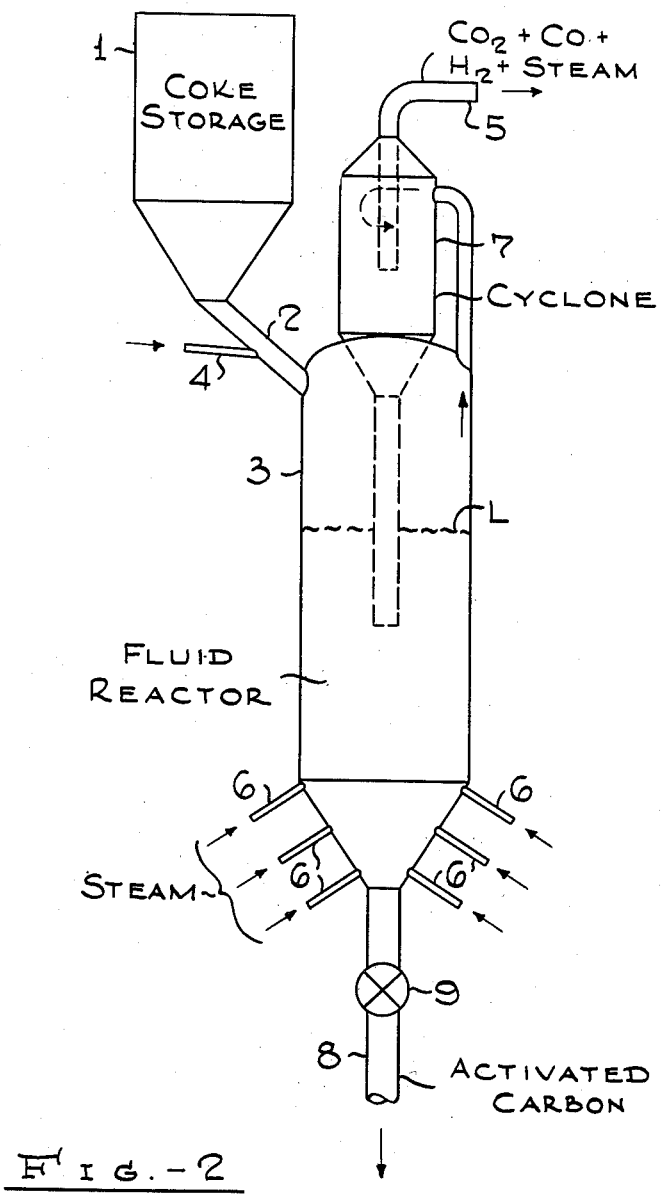

The selectivities of the activated carbons produced by steaming the described acid sludge coke according to this invention for the separation of ethylene and propane have been measured over activated carbon yields from 10 wt. percent to 90 wt. percent and it has been found that there is a distinct peak of activity when such activated carbon is obtained at yields of 50 to 60 wt. percent. This critical distinct peak of selectivity is illustrated by the representative data points in the following table:

Figure 2 represents a diagrammatic sketch of a typical fluid reactor for the steam activation of the acid sludge coke. Coke of proper particle size is led from storage vessel 1 via pipe 2 to the tapered reactor 3, wherein the coke builds up a bed designated by the upper level L. If desired an inert gas may be introduced to pipe 2 via line 4 for the purpose of fluidizing the coke. This gas may be $H_2$, $CO_2$, CO, steam or inert mixtures of the same but preferably steam or the off-gases from the

TABLE II

*Selectivity of the activated sludge coke (separation factor) see Table III*

| Yield (wt. percent) | 100 | 86 | 60 | 57 | 56 | 55 | 54 | 52 | 48 | 44 |
|---|---|---|---|---|---|---|---|---|---|---|
| Separation factor | 0.13 | 6.39 | 11.19 | 11.42 | 11.47 | 13.34 | 12.91 | 12.51 | 10.07 | 9.71 |

The foregoing table clearly shows that there is an abrupt peak in the improved separation factor when the activated carbon yield from the described acid sludge coke is definitely in the range of 50 to 60 wt. percent. The required separation factor for the desired activated carbon is in the range of 11 to 13.5.

Figure 3:
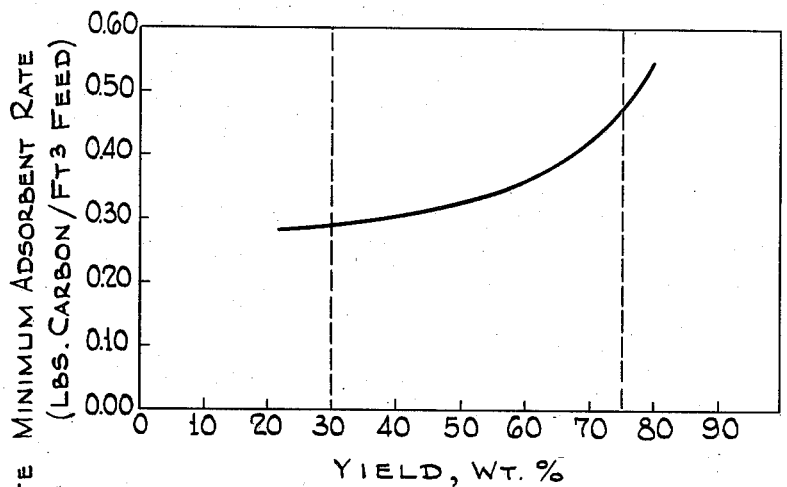
Figure 4:
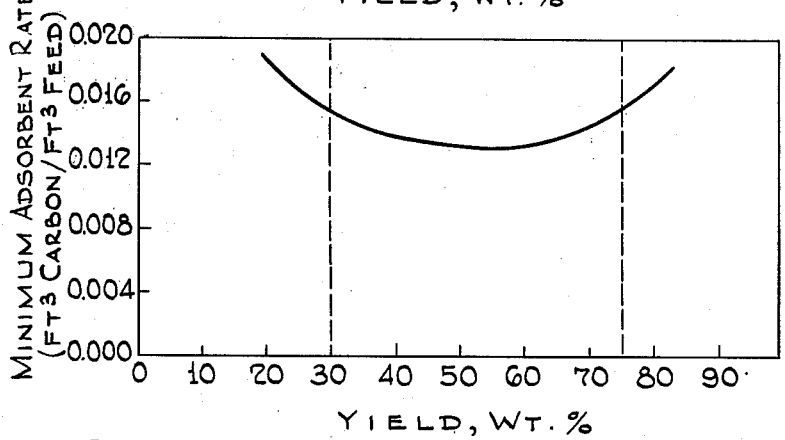
Figure 5:
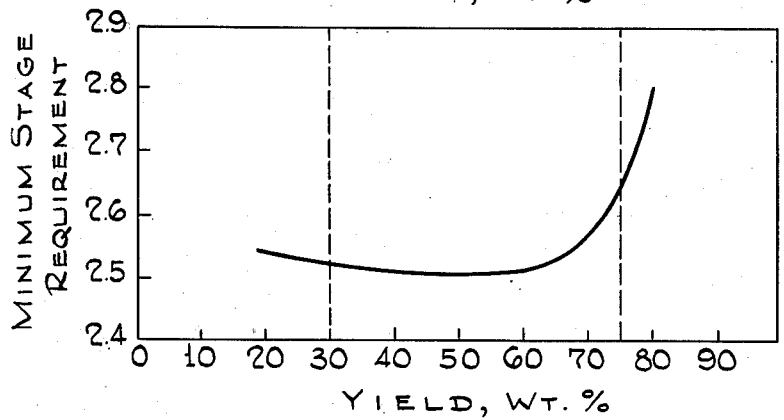

Studies with carbons prepared according to the process of this invention show that the minimum adsorbent rate in pounds, carbon, per cubic foot for separating equimolal ethylene-propane mixture into 95% pure products increases with increasing yield of the carbon from the steam activation process. Due to the effect of the bulk density the minimum volumetric adsorbent rate (cu. ft. carbon/cu. ft. feed) goes through a pronounced minimum at approximately 50–55% yield, then increases at yields above and below this level. The minimum number of stages required for the separation of propane from ethylene is also at this peak level in the range of 50 to 60 wt. percent yield of activated carbon from the described sludge coke. These relationships are shown in Figs. 3, 4, and 5.

The temperature at which steaming or activating of the sludge coke is carried out is not independently critical. The rate at which a given yield of an activated carbon is obtained from the acid sludge coke depends upon the nature of the coke, the temperature of steam, the length of the steaming, the amount of steam (wt. steam/wt. carbon) and the superficial velocity of the steam. Practical steam temperatures are within the range of 1350° to 1800° F., preferably about 1400° to 1650° F. The length of steaming may be in the range of from 10 minutes to 3 hours, preferably 20 minutes to 1 hour. The amount of steam used is in the range of 0.5 to 10.0 wt. steam/wt. carbon. Superficial steam velocities used are from 1.0 to 2.0 ft./sec., preferably 1.4 to 1.6 ft./sec. While it is possible to employ temperatures outside the above range, in the range stated, easier and more efficient control of the activation is possible. The critical control factor in the activation is the precise yield level.

The steaming of the coke may be carried out in any suitable manner but preferably in a reactor in which steam is passed upwardly through a fluidized bed of the coke particles at such a rate that the bed is kept in a continuously fluid state resembling a boiling liquid. A fixed bed activator is suitable also. Due to the thorough mixing encountered in the fluid bed reactor, a product of greater homogeneity of chemical, physical and adsorption properties is obtained.

steam activation process, e. g. that stream emerging from the process via line 5.

The coke within the reaction zone of reactor 3 is heated to the desired temperature, say 1350° F. to 1800° F. but suitable means, such as hot gas, by steam, or by heat exchange means not shown, e. g., hot coils within the bed or by electrical means, etc. Regardless of the manner of heating, steam is introduced into the tapered portion of the reactor via lines 6 in amounts and at velocities previously indicated. When operating batchwise the attainment of the carbon yield level is indicated by checking the total volume of gas produced during the activation process, or by actual measurement of the depth of bed remaining with the aid of pressure taps placed at intervals along the vertical axis of the reactor.

When operating continuously other factors such as rate of burning, bed depth, velocity and contact time must be correlated to determine the point at which the desired yield level is attained.

Gas resulting from the steam-contacting, including $H_2$, $CO_2$, CO and excess steam, pass upwardly into cyclone separator 7 in which carbon particles are extracted therefrom and the remaining gas passes from the reactor via line 5. A portion of the gas, if desired, may be recycled to be employed for fluidizing coke being charged through line 2.

Activated carbon is withdrawn from the reactor by pipe 8 controlled by valve 9.

The activated carbon formed from the described type of acid sludge coke possesses the highly desirable adsorption selectivity and capacity for separating propane from ethylene, methane and ethane when the yield of the activated carbon formed is critically controlled to come within the range of 50 to 60 weight percent.

The following Table III contains data on the selectivity and capacity of the activated carbons employed in the separation of ethylene-propane gaseous mixtures. These carbons were obtained by steaming the described acid sludge coke under the conditions set forth in the table. The cokes were obtained by calcining of sludges from the treatment of petroleum fractions with sulfuric acid, the calcining process having been carried out in the manner outlined, i. e., the sludge was deposited as a coating on the hot seed coke and rapidly decomposed thereon.

TABLE III

| Temp., °F. | Steaming Time (Min.) | W./W./(lb. steam/lb. carbon) | Yield, Wt., Percent | Adsorption (77° F.—1 Atm.) (Millimols/Cm.) | | Selectivity | |
|---|---|---|---|---|---|---|---|
| | | | | $C_2H_4$ | $C_3H_8$ | Alpha* | Gas Comp. at Equilibrium |
| 1,430 | 120 | 7.8 | 52 | 3.55 | 4.86 | 12.51 | 74.8% $C_2H_4$ in vapor. |
| 1,600 | 30 | 2.0 | 56 | 3.52 | 4.87 | 12.39 | 76.8% $C_2H_4$ in vapor. |
| 1,760 | 16 | 1.1 | 54 | 3.60 | 4.95 | 12.00 | 75.0% $C_2H_4$ in vapor. |
| 1,430 | 60 | 1.24 | 79 | 2.84 | 2.75 | 6.25 | 62.0% $C_2H_4$ in vapor. |
| 1,600 | 40 | 3.24 | 44 | 3.50 | 5.59 | 9.71 | 76.0% $C_2H_4$ in vapor. |

*Alpha = selectivity factor = $\frac{A}{B} \times \frac{B'}{A'}$

A = Concentration of more adsorbable propane component in adsorbate.
B = Concentration of less adsorbable ethylene component in adsorbate.
B' = Concentration of less adsorbable ethylene component in unadsorbed gas.
A' = Concentration of more adsorbable propane component in unadsorbed gas.

The activated carbon prepared by this invention is particularly applicable to the separation and recovery of ethylene from petroleum refinery cracking process gases, such as may contain methane, ethane, in addition to ethylene and propane. The propane and ethylene may be present in catalytic cracking gases or thermal cracking gases.

What is claimed is:

1. A process for preparing activated carbon adapted to adsorb propane selectively in a mixture with ethylene, which consists essentially in introducing into a decomposition zone a stream of preheated petroleum acid sludge coke particles preheated to a temperature of 1000° F. to 1200° F. as seed coke particles, simultaneously introducing into said decomposition zone one part by weight of petroleum acid sludge from each 2 to 6 parts by weight of said seed coke particles entering the decomposition zone to deposit said sludge on said seed coke at 1000° F. to 1200° F., carbonizing the sludge deposited on the seed coke in the decomposition zone while distilling volatile matter from the thus deposited sludge undergoing carbonization and simultaneously cooling the coke having the freshly carbonized sludge deposit thereon down to a temperature in the range of 300° to 750° F. as the coke travels through the decomposition zone in less than 10 minutes, removing the thus cooled coke particles with freshly carbonized sludge deposit thereon from said decomposition zone, thereafter treating the resulting coke particles removed from said decomposition zone with steam at 1400° to 1650° F. until between 40 and 50 weight percent of the coke particles treated is reacted with steam to give a yield of 50 to 60 weight percent of the activated carbon based on the weight of the steam treated coke particles.

2. In a process of selectively adsorbing propane from a mixture thereof with ethylene, the improvement which comprises contacting the mixture of propane and ethylene with an activated carbon prepared by a combination of steps which consists essentially in decomposing petroleum acid sludge deposited in a ratio of 1 part by weight of sludge per 2 to 6 parts by weight of hot coke on preformed petroleum acid sludge coke particles preheated to temperatures of 1000° to 1200° F., the deposited sludge being carbonized and simultaneously cooled on said preheated coke particles to temperatures in the range of 300° to 750° F. in less than 10 minutes, and the resulting coke particles having the thus decomposed sludge thereon being treated with steam at 1350° to 1800° F. until a yield of 50 to 60 weight percent of activated carbon is obtained.

References Cited in the file of this patent
UNITED STATES PATENTS

| | | |
|---|---|---|
| 2,393,214 | Andrews | Jan. 15, 1946 |
| 2,412,667 | Arveson | Dec. 17, 1946 |
| 2,586,889 | Archibald et al. | Feb. 26, 1952 |
| 2,635,709 | Vesterdal et al. | Apr. 21, 1953 |

OTHER REFERENCES

"Hypersorption Process for Separation of Light Gases" by Clyde Berg, A. I. ch. E. Transactions, vol. 42, No. 4, pages 665–680.